(12) United States Patent
Liguori et al.

(10) Patent No.: US 8,103,827 B2
(45) Date of Patent: Jan. 24, 2012

(54) MANAGING PROCESSING SYSTEMS ACCESS TO CONTROL BLOCKS PROVIDING INFORMATION ON STORAGE RESOURCES

(75) Inventors: Gregg Leonard Liguori, Hyde Park, NY (US); David Charles Reed, Tucson, AZ (US); Michael Robert Scott, Ocean View, HI (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/392,047

(22) Filed: Feb. 24, 2009

(65) Prior Publication Data
US 2010/0217930 A1    Aug. 26, 2010

(51) Int. Cl.
*G06F 12/08* (2006.01)
(52) U.S. Cl. .................. 711/114; 711/154; 711/E12.019
(58) Field of Classification Search ........................ None
See application file for complete search history.

(56) References Cited

U.S. PATENT DOCUMENTS

| | | |
|---|---|---|
| 6,546,466 B1 | 4/2003 | Elko et al. |
| 6,609,214 B1 | 8/2003 | Dahlen et al. |
| 6,986,009 B1 | 1/2006 | Lecrone et al. |
| 7,085,956 B2 | 8/2006 | Petersen et al. |
| 7,191,318 B2 | 3/2007 | Tripathy et al. |
| 2008/0168253 A1 | 7/2008 | Garrison |

*Primary Examiner* — Kevin Verbrugge
(74) *Attorney, Agent, or Firm* — David W. Victor; Konrad Raynes & Victor LLP

(57) ABSTRACT

Provided are a method, system, and article of manufacture to manage storage resources in a storage system. Requests by processing systems are received for access to a control block providing information on an address assigned to one of the storage resources to access. A token is generated for each processing system requesting the control block uniquely identifying the processing system and the control block. The processing systems are provided copies of the requested control blocks to use to access the storage resource. A request is received to modify one of the control blocks for one of the storage resources. A determination is made as to whether at least one of the tokens was generated for the control block to modify. At least one processing system associated with the determined at least one token is provided a copy of the modified control block to use to access the storage resource associated with the control block.

20 Claims, 4 Drawing Sheets

MANAGING PROCESSING SYSTEMS ACCESS TO CONTROL BLOCKS PROVIDING INFORMATION ON STORAGE RESOURCES

BACKGROUND

1. Field

The present invention relates to a method, system, and article of manufacture for managing processing systems access to control blocks providing information on storage resources.

2. Description of the Related Art

In certain computing environments, multiple host systems may communicate with multiple control units (CUs) (also known as storage controllers, storage subsystems, enterprise storage servers, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS may be configured to include multiple volumes.

The host system may include a channel subsystem that maintains information to access volumes in an LSS in the control unit. The channel subsystem includes subchannels, which provides state tracking for the execution of the I/O operations for the channel subsystem and provides information on paths connecting the host to a volume in an LSS. The host operating system maintains a unit control block (UCB) providing information on a base unit address assigned to one volume and the subchannel that the channel subsystem uses to access the volume on the base device. The channel subsystem is aware of individual subchannels and the paths they have. The host initiates an I/O operation toward a volume by initiating a channel program which consists of a series of I/O instructions, such as a chain of channel command word (CCW) commands, at the subchannel.

Processing systems executing in a host may access a UCB to use to access the volume represented by the UCB. In the Z/OS® operating system from International Business Machines Corporation ("IBM"®), the processing systems may access a UCB by issuing a CAPTURE command to obtain a copy of the UCB, then issuing a PIN command to pin the captured UCB to prevent other processing systems from modifying or deleting the UCB. Any processing system with an interest in a UCB or a captured copy of a UCB should PIN the UCB. The information in captured UCB copies will become invalid if the actual UCB is altered or deleted during change activities such as a dynamic ACTIVATE of an Input/Output Definition File (IODF). PIN-ing CAPTURED UCBs prevents the information in the UCB copy from being altered or deleted. (IBM and Z/OS are trademarks of IBM in the United States and other countries.)

There is a need in the art for improved techniques for managing control blocks, such as UCBs, being accessed by different processing systems.

SUMMARY

Provided are a method, system, and article of manufacture to manage storage resources in a storage system. Requests by processing systems are received for access to a control block providing information on an address assigned to one of the storage resources to access. A token is generated for each processing system requesting the control block uniquely identifying the processing system and the control block. The processing systems are provided copies of the requested control blocks to use to access the storage resource. A request is received to modify one of the control blocks for one of the storage resources. A determination is made as to whether at least one of the tokens was generated for the control block to modify. At least one processing system associated with the determined at least one token is provided a copy of the modified control block to use to access the storage resource associated with the control block.

DETAILED DESCRIPTION

Figure 1:
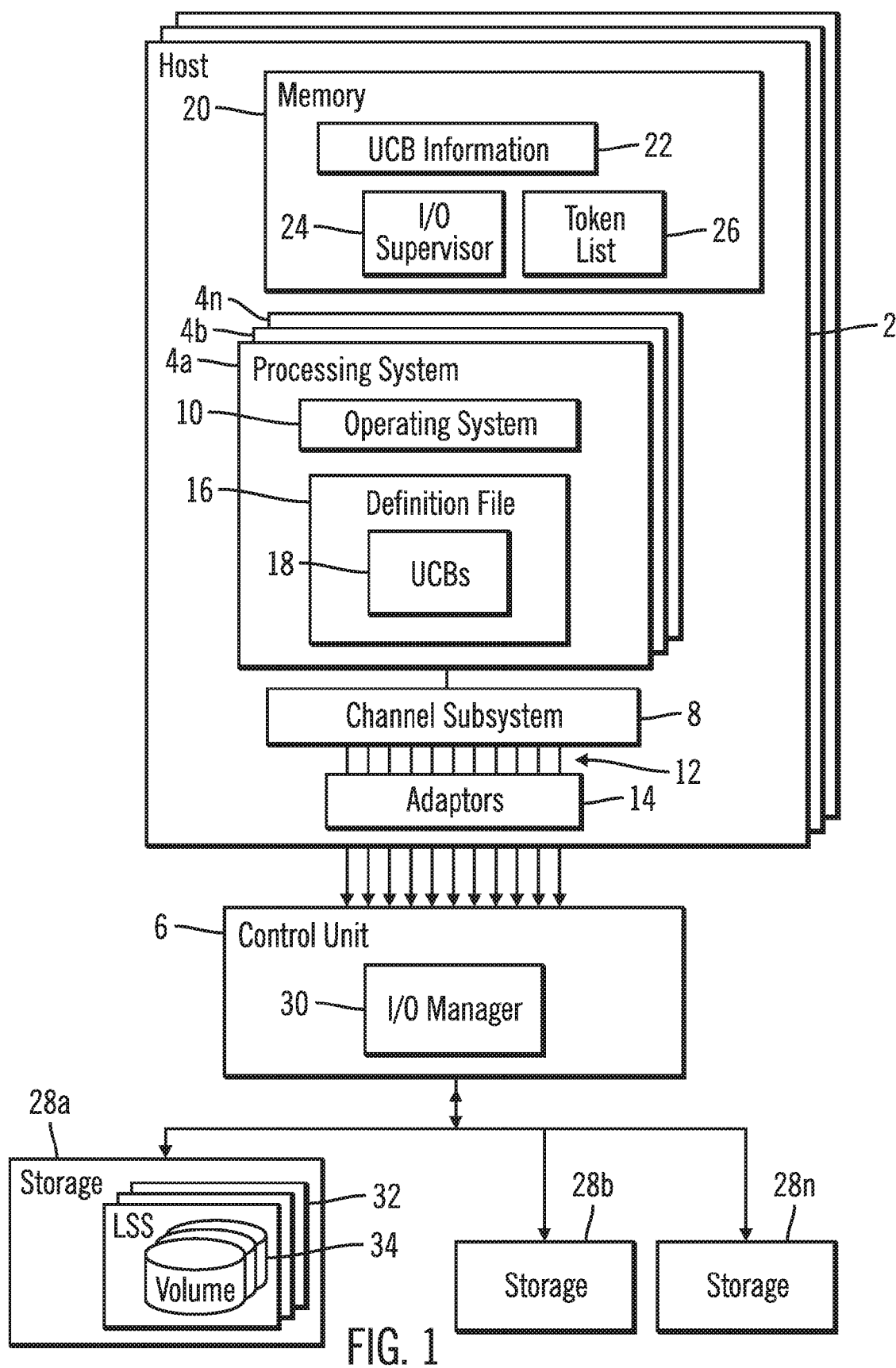
FIG. 1 illustrates an embodiment of a computing environment.

FIG. 1 illustrates a computing environment in which aspects of the invention are implemented. One or more hosts 2 (only one is shown) include one or more processing systems 4a, 4b . . . 4n that communicate Input/Output (I/O) requests to a control unit 6 through a channel subsystem 8 that provides a plurality of logical paths to the control unit 6. Each processing system 4a, 4b . . . 4n includes an operating system 10 to manage I/O operations. The channel subsystem 8 manages logical paths 12 extending through adaptors 14. An adaptor provides the physical layer through which logical paths 12 extend to the control unit 6 or multiple control units through a switch (not shown).

In one embodiment, the channel subsystem 8 may be implemented as firmware or microcode. The channel subsystem 8 may be implemented in dedicated hardware comprising a separate set of integrated circuit chips.

Each processing system 4a, 4b . . . 4n may comprise a virtual machine, such as a logical partition (LPAR), to which computer resources, such as one or more central processing units (CPU) and memory resources are assigned. Each processing system 4a, 4b . . . 4n may execute their own operating system 10, device drivers, and may execute channel subsystem 8 code. In further embodiments, each processing system may comprise a logical partition of a processor. In this way, one or more processors in the host 2 may implement multiple logical partitions (LPARs). Multiple processing systems 4a, 4b . . . 4n may share a single logical channel subsystem 16 or different processing systems 4a, 4b . . . 4n may use different logical channel subsystems. Although the processing system may comprise a separate processing unit independently executing an operating system, drivers, and applications, in an alternative embodiment, the processing systems may comprise an application executing in a runtime environment.

The channel subsystem 8 performs operations to communicate I/O requests from the processing systems 4a, 4b . . . 4n to the control unit 6. The operating system 10 of the processing systems 4a, 4b, 4c maintains a definition file 16 having copies of UCBs 18 the processing system 4a, 4b . . . 4n uses to access the volumes or storage resources associated with the UCB. The processing system 4a, 4b . . . 4n may modify or delete and use its copy of the UCBs 18 to access the volume or storage resource represented by the UCB. In this way, each processing system 4a, 4b . . . 4n maintains its own copy of the UCBs 18 providing information on the UCB chains for each processing system 4a, 4b . . . 4n. Different processing systems 4a, 4b . . . 4n may have different UCBs.

A memory 20, comprised of one or more memory devices, includes information used by the channel subsystem 8 to manage I/O requests. The host memory 18 includes UCB information 22 for all processing systems 4a, 4b . . . 4n and LSSs 32, which is shared for all processing system operations at the same time. Each processing system 4a, 4b . . . 4n further maintains in its own memory a copy of the UCB information 20 to use. The memory 18 further includes an I/O supervisor 24 that manages and monitors requests from the processing systems 4a, 4b . . . 4n with respect to the UCBs. A token list 26 includes tokens generated for processing systems 4a, 4b . . . 4n provided access to UCBs. A token may uniquely identify the processing system 4a, 4b . . . 4n and UCB being accessed by the processing system 4a, 4b . . . 4n.

In the embodiment of FIG. 1, the I/O supervisor 24 comprises a program executed by the host in the memory 20. The I/O supervisor 24 may be executed in the host 2 separate from the processing systems 4a, 4b . . . 4n, or be executed by one of the processing systems 4a, 4b . . . 4n. In an alternative embodiment, the I/O supervisor may be implemented in a hardware device in the host 2 or the channel subsystem 8.

The control unit 6 manages requests from the processing systems 4a, 4b . . . 4n to access storage systems 28a, 28b . . . 28n, such as tracks, partitions, logical devices, logical volumes, logical unit numbers (LUNs), logical subsystems (LSS) or other logical or physical units of storage. Storage 28a shows a configuration including one or more LSSs 32, where one or more volumes 34 are configured in each LSS 32. The volumes may extend across multiple storage devices. The term "device" refers to any physical or logical data storage unit, such as a physical track, LSS, partition, logical volume, volume, etc. The control unit 6 includes an I/O manager program 30 to process I/O requests to the storages 28a, 28b . . . 28n and logical and physical components configured therein, e.g., volumes, LSSs, etc. The processing systems 4a, 4b . . . 4n and control unit 6 may select any logical path in the path group established for the processing system 4a, 4b . . . 4n to communicate requests, information and alerts.

The hosts 2 may comprise computational devices known in the art, such as a workstation, mainframe, server, etc. The control unit 6 may comprise a storage subsystem or server, such as an enterprise storage server, storage controller, etc., or other device used to manage I/O requests to attached volumes. The storages 28a, 28b . . . 28n may comprise storage devices known in the art, such as interconnected hard disk drives (e.g., configured as a DASD, RAID, JBOD, virtualized devices, etc.), magnetic tape, electronic memory, flash memory, optical disk, etc. The host 2 may communicate with the control unit 6 over the logical paths 12, which may extend through a network, such as a Local Area Network (LAN), Storage Area Network (SAN), Wide Area Network (WAN), peer-to-peer network, wireless network, etc. Alternatively, the host 2 may communicate with the storage controller 6 over a bus interface, such as a Peripheral Component Interconnect (PCI) bus or serial interface.

Figure 2:
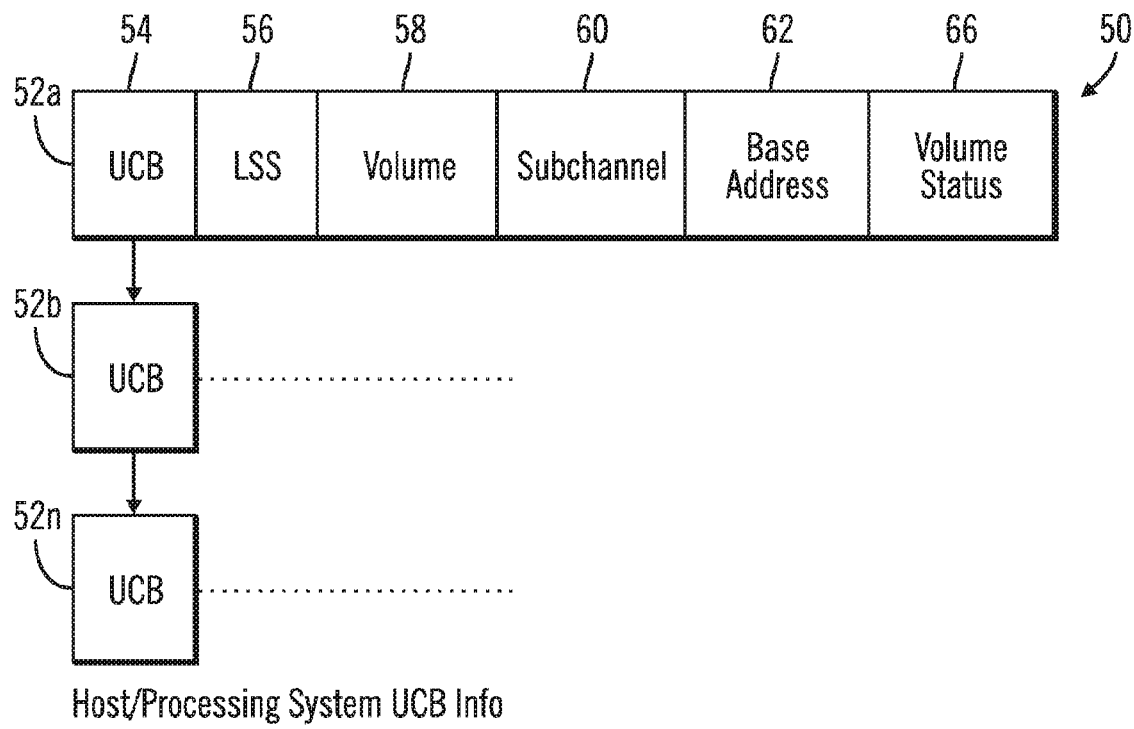
FIG. 2 illustrates an embodiment of a chain of Unit Control Blocks (UCBs) as is known in the prior art.

FIG. 2 illustrates host/processing system UCB information 50 known in the prior art having information on the assignment of base and alias addresses to the volumes for one processing system 4a, 4b . . . 4n and LSS 32. An instance of the information 50 would be maintained for each separate processing system 4a, 4b . . . 4n and LSS 32 pair in the host 2. The instances of the UCB information 50 comprise the UCB information 20. The information 50 includes UCB entries 52a, 52b . . . 52n for one processing system 4a, 4b . . . 4n, which includes for each UCB in the chain the following information: a UCB identifier 54 of a UCB providing information to access one volume configured in the storages 28a, 28b . . . 28; a logical subsystem (LSS) 56 identifying an LSS 32 in which the volume 34 is configured; a volume 58 in the LSS 32 identified in field 56 for which the information is provided; a subchannel 60 of the channel subsystem 8 comprising a subchannel number, index or pointer providing information on the volume; a base address 62 for the subchannel. The UCB 52a, 52b . . . 52n may further include one or more alias addresses for a base address 62 used to additionally address the volume (if any have been assigned); and volume status 66 providing information on the status of the volume.

In the illustrated embodiment of FIG. 2, the UCB information 50 provides a chain of UCBs 52a, 52b . . . 52n for one processing system 4a, 4b . . . 4n and one LSS 32 configured in the storages 28a, 28b . . . 28n, where each UCB 52a, 52b . . . 52n includes information for one volume. In alternative embodiments, the UCB information 50 may include different information for different storage systems and environments to provide information on base and alias addresses assigned to volumes configured in the storages 28a, 28b . . . 28n. Further, if the system is not implementing channel subsystem technology, then information on the subchannel, such as field 60 may not be included.

Figure 3:
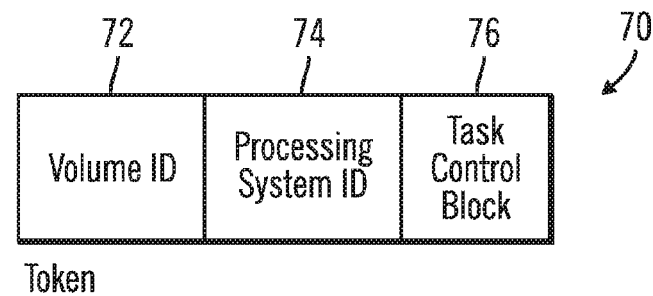
FIG. 3 illustrates an embodiment of a token generated for a processing a UCB and processing system pair in accordance with described embodiments.

FIG. 3 illustrates an embodiment of a token 70 generated for a processing system 4a, 4b . . . 4n accessing a UCB 52a, 52b . . . 52n. The token 70 may be generated from or include a volume identifier (ID), such as a volume serial number of the volume identified by the UCB 52a, 52b . . . 52n and a processing system identifier (ID) 74. The processing system identifier 74 may comprise an address of the logical partition assigned by the host 2 architecture, such as the host 2 hardware or firmware, to uniquely identify the partition, or identify the address space in which the processing system 4a, 4b . . . 4n executes. The token 70 may further be generated from a task control block (TCB) 76. The task control block (TCB) may comprise a data structure representing a task, or thread of execution, from which the request for the UCB originated. Task or threads of execution in the storage subsystem 2 that may execute independently of other tasks, i.e., threads of execution, and may be represented by a data structure, such as a task control block. The token 70 comprises a unique identifier of the processing system 4a, 4b . . . 4n and UCB pair being accessed by the identified processing system 4a, 4b . . . 4n.

Figure 4:
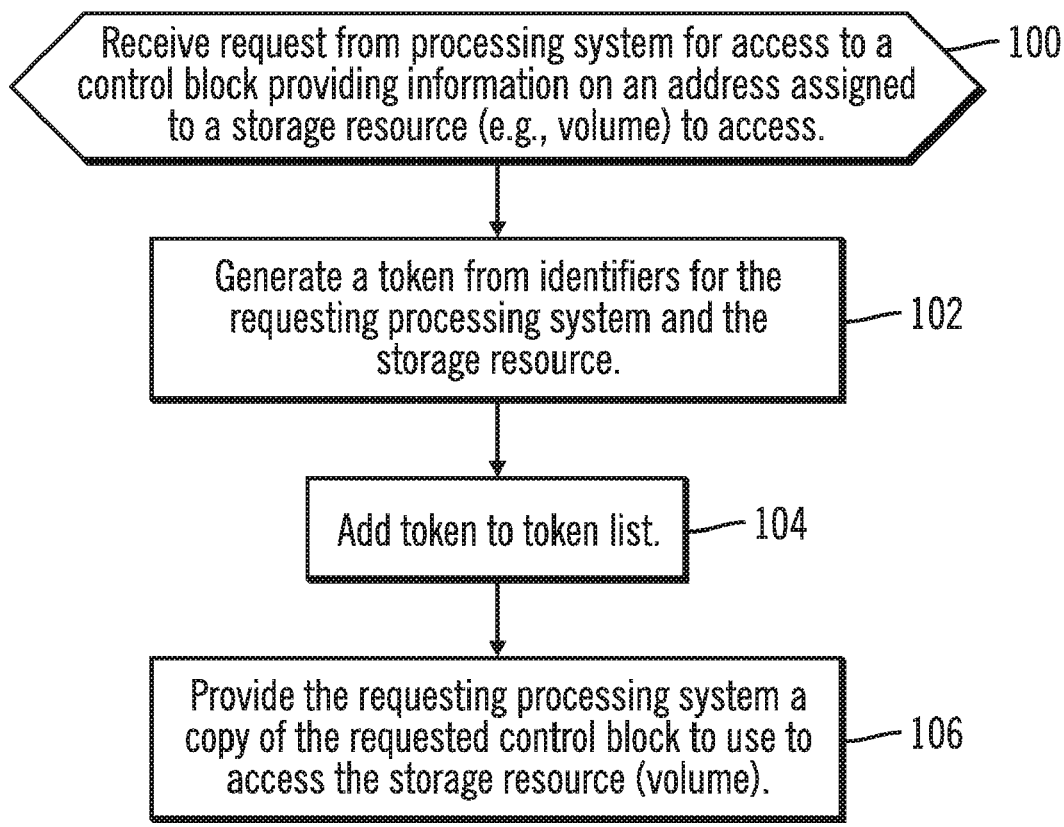
FIG. 4 illustrates an embodiment of operations to generate a token in accordance with described embodiments.
Figure 5:
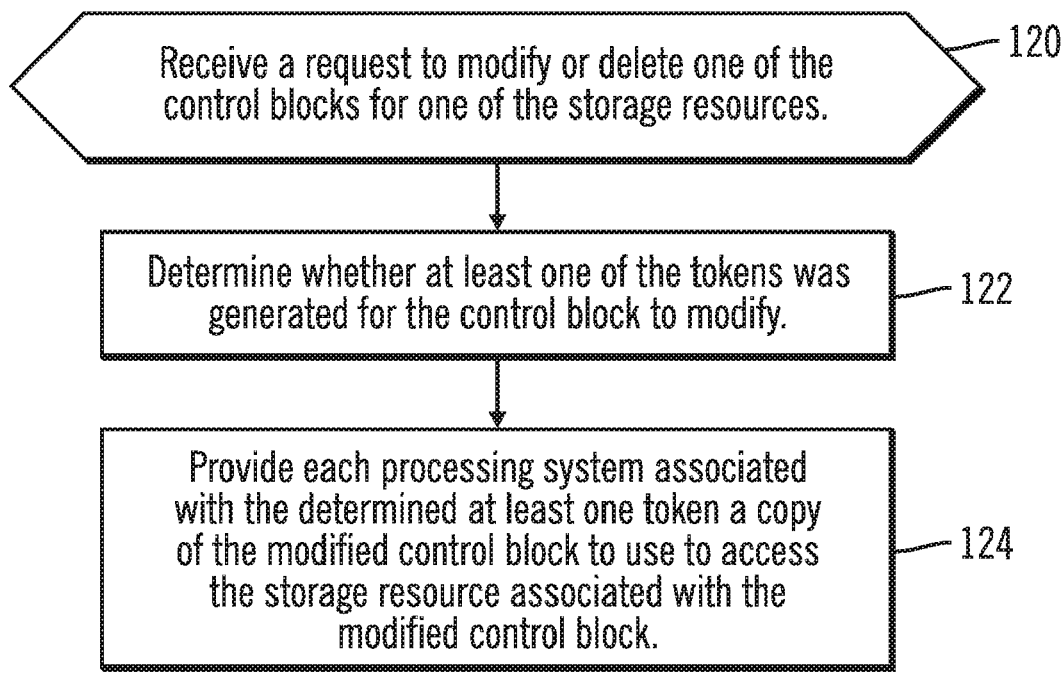
FIG. 5 illustrates an embodiment of operations to process a request to modify or delete a control block (UCB) in accordance with described embodiments.
Figure 6:
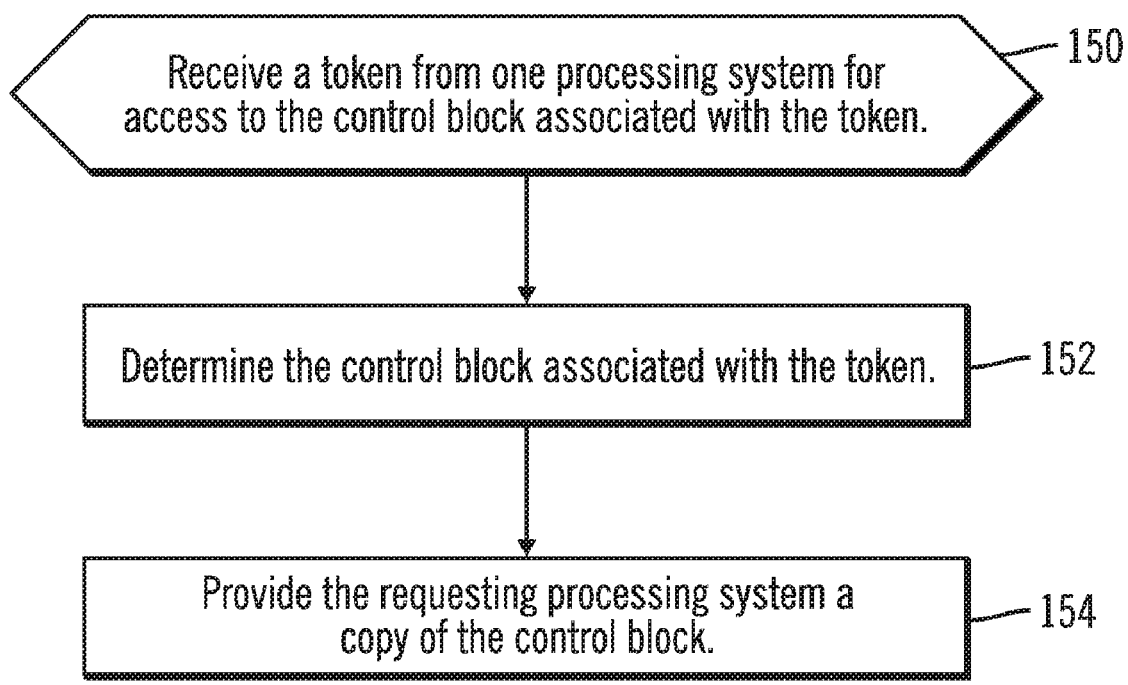
FIG. 6 illustrates an embodiment of operations to process a token provided to access a control block in accordance with described embodiments.

FIGS. 4, 5, and 6 illustrate operations performed by the I/O supervisor 24 to manage the processing system 4a, 4b . . . 4n access and use of the UCBs 50. With respect to FIG. 4, the I/O supervisor 24 receives (at block 100) a requests from a processing system 4a, 4b . . . 4n for access to a control block (e.g., UCB 52a, 52b . . . 52n) providing information on an address assigned to a storage resource (e.g., volume) to access. The request may comprise a UCB CAPTURE to access a particular UCB. The I/O supervisor 24 generates (at block 102) a token 70 from at identifiers for the requesting processing system 74 and the storage resource 72. The generated token 70 is added (at block 104) to the token list 26. The I/O supervisor 24 may then provide (at block 106) the requesting processing system 4a, 4b . . . 4n a copy of the requested control block (UCB 52a, 52b . . . 52n) to use to access the storage resource (volume 34). At this point, the processing system 4a, 4b . . . 4n would store the received copy of the UCB 18 in its definition file 16, such as an I/O definition file (IODF), to use to access the volume associated with the UCB.

With respect to FIG. 5, the I/O supervisor 24 receives (at block 120) a request to modify or delete one of control blocks (UCBs) for one of the storage resources, e.g., volumes. In one embodiment, the I/O supervisor 24 may receive a request to modify or delete the UCB and then cause the execution of the modification during an activate. In another embodiment, the I/O supervisor 24 may detect that a copy of the UCB 18 in a processing system 4a, 4b . . . 4n definition file 16 has been modified. The I/O supervisor 24 determines (at block 122) whether at least one of the tokens 70 in the token list 26 was generated for the control block (UCB) to modify or delete. This may be determined by locating tokens 70 having a processing system ID 74 matching the processing system 4a, 4b . . . 4n that initiated the modification and a volume ID 72 matching the volume associated with the UCB subject to the modification. The I/O supervisor 24 provides (at block 124) each processing system 4a, 4b . . . 4n associated with the determined at least one token 70 a copy of the modified control block (UCB) to use to access the storage resource (volume) associated with the modified control block. If the request is to delete a token, then the I/O supervisor 24 provides the processing systems 4a, 4b . . . 4n a message that the token was deleted.

FIG. 6 illustrates an alternative embodiment for providing processing systems 4a, 4b . . . 4n the most recent version of a control block (UCB). In this embodiment, the I/O supervisor 24 provides a processing system 4a, 4b . . . 4n seeking access to a UCB a copy of the generated token 70 with a copy of the requested control block 52a, 52b . . . 52n. The processing system 4a, 4b . . . 4n may then present the token 70 to the I/O supervisor 24 when wanting to access the control block (UCB) so the I/O supervisor 24 can return the most recent copy of the UCB to use when presented the token. With respect to FIG. 6, upon the I/O supervisor 24 receiving (at block 150) a token 70 from one processing system 4a, 4b . . . 4n for access to the control block (UCB 52a, 52b . . . 52n) associated with the token 70, the I/O supervisor 24 determines (at block 152) the control block (UCB) associated with the token 70. This may be determined by using the volume identifier 72 included or associated with the received token 70 to then find the UCB 52a, 52b . . . 52n for that volume ID 72, identified in field 58 (FIG. 2) of the UCB 52a, 52b . . . 52n. The I/O supervisor 24 provides (at block 154) the requesting processing system 4a, 4b . . . 4n the determined control block (UCB 52a, 52b . . . 52n) to use.

The described embodiments provide a technique for an I/O supervisor to provide different processing systems control blocks (UCBs) the processing systems maintain to access a storage resource, such as a volume, in a manner that ensures that the processing systems utilize the most recent copy of the control block, which may be modified by the different processing systems. The described embodiments allow the processing systems to each maintain and use a copy of the control block without locking control blocks from use by other processing systems, because the I/O supervisor generates and utilizes a unique token for each processing system and control block pair for the purpose of providing processing systems the most recent version of the control block.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In the described embodiments, the host may include a channel subsystem to communicate with a control unit. In alternative embodiments, the host and control unit may utilize any suitable client-server architecture and protocols known in the art to communicate and maintain information on base and alias addresses that may be assigned to a volume.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

Further, when a reference letter, such as "a", "b", or "n" is used to denote a certain number of items, the reference "a", "b" or "n" used with different elements may indicate the same or different number of such elements.

FIGS. 2 and 3 show information maintained in a certain format. In alternative embodiments, the information shown in FIGS. 2 and 3 these figures may be maintained in alternative data structures and formats, and in different combinations.

The illustrated operations of FIGS. 4, 5, and 6 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method implemented in a computer system to manage storage resources in a storage system, comprising:

receiving requests by processing systems for access to a control block providing information on an address assigned to one of the storage resources to access;

generating a token for each of the processing systems requesting the control block uniquely identifying the processing system and the control block;

providing the processing systems copies of the requested control blocks to use to access the storage resource;

receiving a request to modify one of the control blocks for one of the storage resources;

determining whether at least one of the tokens was generated for the control block to modify; and providing at least one of the processing systems associated with the determined at least one token a copy of the modified control block to use to access the storage resource associated with the control block.

2. The method of claim 1, wherein the request to modify the control block is requested by one of the processing systems to modify or delete the processing system copy of the control block further comprising:

modifying or deleting the copy of the control block maintained by the processing system that requested the modification or deletion.

3. The method of claim 2, wherein the token is generated from identification of the storage resource identified by the control block and an identifier of the processing system requesting the control block.

4. The method of claim 3, wherein the identifier of the processing system requesting the control block comprises an address space in which the processing system executes.

5. The method of claim 1, further comprising:

providing at least one of the processing systems the token generated for the processing system request access to the control block; and receiving the token from one of the processing systems provided the token with a request to access the control block, wherein the copy of the control block is provided to the processing system in response to receiving the token.

6. The method of claim 5 wherein providing the at least one processing system associated with the determined at least one token a copy of the modified control block to use to access the storage resource is performed in response to receiving the token from the processing system requesting to access the control block.

7. The method of claim 1, wherein the storage resource comprises a volume on the storage system, wherein the control block comprises a unit control block providing information on an address assigned to the volume.

8. A system coupled to storage resources in a storage system, comprising:
processing systems;
a computer readable storage medium;
an Input/Output (I/O) supervisor coupled to the processing systems and for performing operations, the operations comprising:
receiving requests by the processing systems for access to a control block in the computer readable storage medium providing information on an address assigned to one of the storage resources to access;
generating a token for each of the processing systems requesting the control block uniquely identifying the processing system and the control block;
providing the processing systems copies of the requested control blocks to use to access the storage resource;
receiving a request to modify one of the control blocks for one of the storage resources;
determining whether at least one of the tokens was generated for the control block to modify; and
providing at least one of the processing systems associated with the determined at least one token a copy of the modified control block to use to access the storage resource associated with the control block.

9. The system of claim 8, wherein the request to modify the control block is requested by one of the processing systems to modify or delete the processing system copy of the control block further comprising:
modifying or deleting the copy of the control block maintained by the processing system that requested the modification or deletion.

10. The system of claim 9, wherein the token is generated from identification of the storage resource identified by the control block and an identifier of the processing system requesting the control block.

11. The system of claim 10, wherein the identifier of the processing system requesting the control block comprises an address space in which the processing system executes.

12. The system of claim 8, wherein the operations further comprise:
providing at least one of the processing systems the token generated for the processing system request access to the control block; and
receiving the token from one of the processing systems provided the token with a request to access the control block, wherein the copy of the control block is provided to the processing system in response to receiving the token.

13. The system of claim 12 wherein providing the at least one processing system associated with the determined at least one token a copy of the modified control block to use to access the storage resource is performed in response to receiving the token from the processing system requesting to access the control block.

14. An article of manufacture comprising a computer readable storage medium including a program executed by a processor to manage storage resources in a storage system and to perform operations, the operations comprising:
receiving requests by processing systems for access to a control block providing information on an address assigned to one of the storage resources to access;
generating a token for each of the processing systems requesting the control block uniquely identifying the processing system and the control block;
providing the processing systems copies of the requested control blocks to use to access the storage resource;
receiving a request to modify one of the control blocks for one of the storage resources;
determining whether at least one of the tokens was generated for the control block to modify; and
providing at least one of the processing systems associated with the determined at least one token a copy of the modified control block to use to access the storage resource associated with the control block.

15. The article of manufacture of claim 14, wherein the request to modify the control block is requested by one of the processing systems to modify or delete the processing system copy of the control block further comprising:
modifying or deleting the copy of the control block maintained by the processing system that requested the modification or deletion.

16. The article of manufacture of claim 15, wherein the token is generated from identification of the storage resource identified by the control block and an identifier of the processing system requesting the control block.

17. The article of manufacture of claim 16, wherein the identifier of the processing system requesting the control block comprises an address space in which the processing system executes.

18. The article of manufacture of claim 14, wherein the operations further comprise:
providing at least one of the processing systems the token generated for the processing system request access to the control block; and
receiving the token from one of the processing systems provided the token with a request to access the control block, wherein the copy of the control block is provided to the processing system in response to receiving the token.

19. The article of manufacture of claim 18 wherein providing the at least one processing system associated with the determined at least one token a copy of the modified control block to use to access the storage resource is performed in response to receiving the token from the processing system requesting to access the control block.

20. The article of manufacture of claim 14, wherein the storage resource comprises a volume on the storage system, wherein the control block comprises a unit control block providing information on an address assigned to the volume.

* * * * *